United States Patent
Reddy et al.

(10) Patent No.: US 6,846,357 B2
(45) Date of Patent: Jan. 25, 2005

(54) METHODS OF CEMENTING HIGH TEMPERATURE WELLS AND CEMENT COMPOSITIONS THEREFOR

(75) Inventors: Baireddy R. Reddy, Duncan, OK (US); Lance E. Brothers, Chickasha, OK (US); Anthony V. Palmer, Ardmore, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 0 days.

(21) Appl. No.: 10/869,660

(22) Filed: Jun. 16, 2004

(65) Prior Publication Data

US 2004/0255822 A1 Dec. 23, 2004

Related U.S. Application Data

(60) Division of application No. 10/295,113, filed on Nov. 15, 2002, now Pat. No. 6,796,378, which is a continuation-in-part of application No. 09/971,405, filed on Oct. 5, 2001, now Pat. No. 6,488,763, which is a continuation of application No. 09/635,603, filed on Aug. 9, 2000, now Pat. No. 6,332,921, which is a continuation of application No. 09/123,004, filed on Jul. 27, 1998, now Pat. No. 6,143,069, which is a continuation-in-part of application No. 08/912,203, filed on Aug. 15, 1997, now Pat. No. 5,900,053.

(51) Int. Cl.$^7$ .............................................. C04B 24/10
(52) U.S. Cl. ...................... 106/692; 106/696; 106/705; 106/730; 106/823
(58) Field of Search ................................ 106/692, 696, 106/705, 730, 823

(56) References Cited

U.S. PATENT DOCUMENTS

| | | | |
|---|---|---|---|
| 2,250,107 A | 7/1941 | Nelles | 106/97 |
| 3,180,748 A | 4/1965 | Holmgren et al. | 106/104 |
| 3,782,985 A | 1/1974 | Gebhardt | 106/97 |
| 3,901,316 A | 8/1975 | Knapp | 166/250 |
| 4,003,838 A | 1/1977 | Jackson et al. | 252/8.5 A |
| 4,256,503 A | 3/1981 | Tsuda et al. | 106/100 |
| 4,310,486 A | 1/1982 | Cornwell et al. | 264/209 |
| 4,397,354 A | 8/1983 | Dawson et al. | 166/294 |
| 4,537,918 A | 8/1985 | Parcevaux et al. | 523/130 |
| 4,596,834 A | 6/1986 | Widener et al. | 521/83 |
| 4,916,012 A | 4/1990 | Sawanobori et al. | 428/367 |
| 5,032,181 A | 7/1991 | Chung | 106/717 |
| 5,120,367 A | 6/1992 | Smith et al. | 106/823 |
| 5,147,565 A | 9/1992 | Bour et al. | 252/8.551 |
| 5,185,389 A | 2/1993 | Victor | 521/2 |
| 5,250,578 A | 10/1993 | Cornwell | 521/83 |
| 5,258,222 A | 11/1993 | Crivelli | 428/323 |
| 5,339,903 A | 8/1994 | Eoff et al. | 166/293 |
| 5,340,397 A | 8/1994 | Brothers | 106/727 |
| 5,391,226 A | 2/1995 | Frankowski | 106/696 |
| 5,453,310 A | 9/1995 | Andersen et al. | 428/34.4 |
| 5,456,751 A | 10/1995 | Zandi et al. | 106/724 |
| 5,588,489 A | 12/1996 | Chatterji et al. | 166/293 |
| 5,624,489 A | 4/1997 | Fu et al. | 106/692 |
| 5,696,059 A | 12/1997 | Onan et al. | 507/269 |
| 5,900,053 A | 5/1999 | Brothers et al. | 106/678 |
| 5,989,336 A | 11/1999 | Carpenter et al. | 106/811 |
| 6,063,738 A | 5/2000 | Chatterji et al. | 507/269 |
| 6,143,069 A | 11/2000 | Brothers et al. | 106/678 |
| 6,332,921 B1 | 12/2001 | Brothers et al. | 106/692 |
| 6,488,763 B2 | 12/2002 | Brothers et al. | 106/692 |
| 2002/0050231 A1 | 5/2002 | Brothers et al. | 106/692 |

OTHER PUBLICATIONS

Publication entitled "*Lightweight $CO_2$–Resistant Cements For Geothermal Well Completions*", by Lawrence E. Kukacka, et al., publisher unknown and undated, but admitted to be prior art.

Publication entitled "*Microsphere–Filled Lightweight Calcium Phosphare Cements*" by Toshifumi Sugama, et al. under the auspices of the U.S. Department of Energy, Washington, D.C. under Contract No. DE–AC02–76CH00016; undated but admitted to be prior art.

Publication entitled "*Interfaces and Mechanical Behaviors of Fiber–Reinforced Calcium Phosphate Cement Compositions*", By T. Sugama, et al. prepared for the Geothermal Division U.S. Department of Energy; Department of the Applied, Science, Jun., 1992, but admitted to be prior art.

Publication entitled "*Mullite Microsphere–Filled Lightweight Calcium Phosphate Cement Slurries for Geothermal Wells: Setting and Properties*" by T. Sugama, et al. published in the Cement and Concrete Research Journal, vol. 25, No. 6, pp. 1305–1310 (1995).

Publication entitled "*Carbonation of Hydrothermally Treated Phosphate–Bonded Calcium Aluminate Cement*" by T. Sugama, et al. published under the auspices of the U.S. Department of Energy, Washington, D.C. under contract No. DEA–AC02–76CH00016; undated, but admitted to be prior art.

Publication entitled "*Rubber–Tire Particles As Concrete Aggregate*" by Neil Eldin et al published in the Journal of Materials in Civil. Engineering, vol. 5, No. 4, pp. 479–496 Nov. 1993.

Publication entitled "*The Properties Of Rubberized Concretes*" by I. Topcu published in the Cement and Concrete Research Journal, vol. 25, No. 2. Pp. 304–310 (1995).

Publication entitled "*Hot Alkali Carbonation of Sodium Metaphosphate Modified Fly Ash/Calcium Aluminate Blend Hydrothermal Cements*" by T. Sugama published in the Cement and Concrete Research Journal, vol. 26, No. 11, pp. 1661–1672 (1996).

Publication entitled "Calcium Phosphate Cements Prepared by Acid–Base Reaction", by Toshifumi Sugama, et al. published in the Journal of the American Ceramic Society vol. 75, No. 8, pp. 2076–2087 (1992).

Abstract No. XP–002271968 entitled "New water–based muds for teritary shale control" dated Dec. 1992.

Paper entitled "Sodium–polyphosphate–modified fly ash/calcium aluminate blend cement: durability in wet, harsh, geothermal environments" by T. Sugama et al., dated Jan. 2000.

Primary Examiner—Paul Marcantoni
(74) Attorney, Agent, or Firm—Craig W. Roddy; McAfee & Taft

(57) ABSTRACT

The present invention light weight high temperature well cement compositions and methods. The compositions are basically comprised of calcium aluminate, ASTM class F fly ash, sodium polyphosphate, a cationic derivatized starch fluid loss control additive and water.

36 Claims, No Drawings

METHODS OF CEMENTING HIGH TEMPERATURE WELLS AND CEMENT COMPOSITIONS THEREFOR

CROSS-REFERENCE TO RELATED APPLICATIONS

This application is a divisional of U.S. patent application Ser. No. 10/295,113, filed Nov. 15, 2002, now U.S. Pat. No. 6,796,378, which is a continuation-in-part of U.S. patent application Ser. No. 09/971,405, filed Oct. 5, 2001, now U.S. Pat. No. 6,488,763, which is a continuation of U.S. patent application Ser. No. 09/635,603, filed Aug. 9, 2000, now U.S. Pat. No. 6,332,921, which is a continuation of U.S. patent application Ser. No. 09/123,004, filed Jul. 27, 1998, now U.S. Pat. No. 6,143,069, which is a continuation-in-part of U.S. patent application Ser. No. 08/912,203, filed Aug. 15, 1997, now U.S. Pat. No. 5,900,053, the entire disclosures of which are incorporated herein by reference.

BACKGROUND OF THE INVENTION

1. Field of the Invention

The present invention relates generally to methods of cementing high temperature wells and cement compositions therefor, and more particularly, to such methods and compositions which are suitable for cementing high temperature wells containing carbon dioxide.

2. Description of the Prior Art

In the completion of high temperature subterranean wells and particularly in such wells containing carbon dioxide, e.g., geothermal wells, the use of conventional hydraulic cement compositions often results in early well failure. Because of the high static well bore temperatures involved often coupled with the presence of brines containing carbon dioxide, conventional hydraulic well cements rapidly deteriorate due to alkali carbonation, especially sodium carbonate induced carbonation. In geothermal wells which typically involve very high temperatures, pressures and carbon dioxide concentrations, conventional well cement failures have occurred in less than five years causing the collapse of the well casing.

It has heretofore been discovered that a cement material known as calcium phosphate cement formed by an acid-base reaction between calcium aluminate and a phosphate-containing solution has high strength, low permeability and excellent carbon dioxide resistance when cured in hydrothermal environments. It has also heretofore been discovered that a cement composition formed of calcium aluminate, fly ash, sodium polyphosphate and sufficient water to form a pumpable slurry has excellent strength and carbon dioxide resistance when cured in hydrothermal environments. While this cement composition has achieved success in cementing high temperature wells including those containing carbon dioxide, the cement material has been subject to high fluid losses when placed in the wells.

Thus, there are needs for well cement compositions useful in cementing high temperature wells including those containing carbon dioxide which have low fluid losses.

SUMMARY OF THE INVENTION

The present invention provides improved methods and cement compositions which meet the needs described above and overcome the deficiencies of the prior art. The methods and cement compositions are useful in high temperature wells and are particularly useful in high temperature wells containing carbon dioxide such as geothermal wells.

The methods of the present invention for cementing a high temperature subterranean zone penetrated by a well bore basically comprise the steps of forming a well cement composition of this invention, pumping the cement composition into the subterranean zone by way of the well bore and allowing the cement composition to set into a hard impermeable mass therein.

A cement composition of the present invention is basically comprised of calcium aluminate, fly ash, sodium polyphosphate, a fluid loss control additive, and sufficient water to form a pumpable slurry. When required, a set retarder can also be included in the composition.

The objects, features and advantages of the present invention will be readily apparent to those skilled in the art upon a reading of the description of preferred embodiments which follows.

DESCRIPTION OF PREFERRED EMBODIMENTS

As mentioned above, high temperature wells including those containing carbon dioxide such as geothermal wells generally require the use of well cement compositions which do not deteriorate. The term "high temperature" is used herein to mean wells wherein the static bottom hole temperature is above about 200° F. up to as high as about 800° F. When conventional hydraulic cements are utilized in such wells, deterioration of the cement often occurs. The deterioration can be caused by the high temperatures in the well or the high temperatures and carbonation. Carbonation causes dissolution of the cement which is converted into water-soluble salts. Further, severe corrosion of steel pipe takes place thereby resulting in the total disruption of the conventional cement supported well structure.

As mentioned above, cement compositions have heretofore been developed and used successfully in high temperature wells which resist deterioration. However, such cement compositions have generally suffered from high fluid loss problems.

By the present invention, improved well cement compositions are provided which resist high temperature deterioration and have low fluid loss. A cement composition of this invention is basically comprised of calcium aluminate, fly ash, sodium polyphosphate, a fluid loss control additive and sufficient water to form a pumpable slurry.

Another composition of this invention is comprised of calcium aluminate, fly ash, sodium polyphosphate, a set retarder, a fluid loss control additive and sufficient water to form a pumpable slurry.

The calcium aluminate can be any commercial grade calcium aluminate suitable for use as a cement. A suitable such calcium aluminate is commercially available from the LaFarge Calcium Aluminates of Chesapeake, Va., under the trade designation "SECAR-60™." The calcium aluminate is generally included in the cement composition in an amount in the range of from about 15% to about 50% by weight of the composition and more preferably about 30.8%.

Fly ash is the finely divided residue that results from the combustion of ground or powdered coal and is carried by the flue gases generated. A particular fly ash that is suitable in accordance with the present invention is a fine particle size ASTM class F fly ash having a Blaine fineness of about 10,585 square centimeters per gram which is commercially available from LaFarge Corporation of Michigan under the trade designation "POZMIX™." Another fly ash that is suitable is an ASTM class F fly ash which is commercially available from Halliburton Energy Services of Dallas, Tex.

under the trade designation "POZMIX™ A." The fly ash is generally included in the composition in an amount in the range from about 15% to about 50% by weight of the composition and more preferably in an amount of about 30.8%.

The major crystalline phase of ASTM class F fly ash is mullite ($3Al_2O_3.2SiO_2$). It reacts with calcium aluminate to form calcium alumino silicate ($CaO.Al_2O_3.2SiO_2$). Also, iron and quartz in the fly ash react with the calcium aluminate to form andradite ($Ca_3Fe_2SiO_4)_3$. These reactions increase the compressive strength of the set cement as compared to set calcium aluminate cement alone.

The sodium polyphosphate includes sodium hexametaphosphate and sodium triphosphate as well as vitreous sodium phosphates. A suitable sodium polyphosphate for use in accordance with the present invention is commercially available from Calgon Corporation of Pittsburgh, Pa. The sodium polyphosphate is included in the cement composition in an amount in the range of from about 2% to about 13% by weight of the composition and more preferably about 3.2%. The sodium polyphosphate combines with the calcium aluminate to form calcium phosphate in the form of hydroxyapatite. Hydroxyapatite ($Ca_5(PO_4)_3OH$) is an acid resistant mineral.

The fluid loss control additive which substantially prevents fluid loss from the well cement compositions of this invention in high temperature wells is a cationic derivatized starch. The cationic derivatized starch is the reaction product of amylopectin and 3-chloro-2-hydroxytrimethylammonium chloride. A suitable such cationic derivatized starch is commercially available under the tradename "REDIBOND 5330™" from the National Starch Company of Bridgewater, N.J. The fluid loss control additive is generally included in the cement composition in an amount in the range of from about 0.5% to about 2% by weight of the composition, and more preferably in an amount of about 1.2%.

The water utilized can be from any source provided it does not contain an excess of compounds that adversely affect other compounds in the cement composition. For example, the water can be fresh water or salt water. The term "salt water" is used herein to mean unsaturated salt water and saturated salt water including brine and seawater. Generally, the water is present in the cement composition in an amount sufficient to form a pumpable slurry, i.e., an amount in the range of from about 30% to about 60% by weight of the composition, and more preferably in an amount of about 34%.

In order to provide resiliency to the set cement compositions of this invention, the compositions may optionally include inert ground rubber particles. Such particles are produced from worn out tires and are commercially available from Four D Corporation of Duncan, Okla.

At static well bore temperatures above about 125° F., a set retarder is required. The set retarder functions to lengthen the time in which the cement composition starts to thicken and set so that the composition can be pumped into the well bore and into the zone to be cemented before such thickening takes place. Preferred such set retarders for use in accordance with this invention are tartaric acid and citric acid. When used, the set retarder is included in the cement composition in an amount in the range of from about 0.5% to about 4% by weight of the composition, more preferably about 1.5%.

A method of the present invention for cementing a high temperature subterranean zone penetrated by a well bore is generally comprised of the following steps. A well cement composition is provided comprised of calcium aluminate, fly ash, sodium polyphosphate, a fluid loss control additive and sufficient water to form a pumpable slurry. The cement composition is pumped into a subterranean zone by way of the well bore, and the cement composition is allowed to set into a hard impermeable mass therein.

A preferred method of this invention for cementing a high temperature subterranean zone penetrated by a well bore is comprised of the steps of: (a) providing a well cement composition comprised of calcium aluminate, fly ash, sodium polyphosphate, a cationic derivatized starch fluid loss control additive and sufficient water to form a pumpable slurry; (b) pumping said cement composition into said subterranean zone by way of said well bore; and (c) allowing said cement composition to set into a hard impermeable mass therein.

A preferred cement composition useful in cementing high temperature wells of the present invention is comprised of: calcium aluminate present in an amount of about 30.8% by weight of the composition; ASTM class F fly ash present in an amount of about 30.8% by weight of the composition; sodium polyphosphate present in an amount of about 3.2% by weight of the composition; a fluid loss control additive comprised of a cationic derivatized starch present in an amount of about 1.2% by weight of the composition and water present in an amount of about 34% by weight of the composition.

Another preferred cement composition useful in cementing high temperature wells of the present invention is comprised of: calcium aluminate present in an amount of about 30.4% by weight of the composition; ASTM class F fly ash present in an amount of about 30.4% by weight of the composition; sodium polyphosphate present in an amount of about 3.2% by weight of the composition; a fluid loss control additive comprised of a cationic derivatized starch present in an amount of about 1.1% by weight of the composition; water present in an amount of about 33.7% by weight of the composition; and a set retarder selected from the group consisting of tartaric acid and citric acid present in an amount of about 1.1% by weight of the composition.

As previously mentioned, the above described cement compositions can include ground rubber particles present in an amount in the range of from about 10% to about 40% by weight of the compositions to improve the resilience of the compositions.

The cement compositions of this invention may be prepared in accordance with any of the mixing techniques utilized in the art. In one preferred method, a quantity of water is introduced into a cement blender followed by the calcium aluminate, fly ash, sodium polyphosphate and a fluid loss control additive comprised of a cationic derivatized starch. The mixture is agitated for a sufficient period of time to form a pumpable non-foamed slurry.

In order to further illustrate the improved cement compositions and methods of this invention, the following examples are given.

EXAMPLE 1

Four test cement compositions were prepared each of which was comprised of 380 grams of calcium aluminate, 380 grams of class F fly ash, 40 grams of sodium polyphosphate, 8 grams of tartaric acid set retarder, 8 grams of citric acid set retarder and 360 grams of water. Various prior art fluid loss additives as well as the cationic derivatized starch fluid loss additive of this invention were combined with the test cement compositions in amounts of 8 grams each. The resulting cement compositions were tested for fluid loss at 180° F. in accordance with the test procedure set forth in *API Specification For Materials And Testing For Well Cements*, API Specification 10, 5$^{th}$ Ed., dated Jul. 1, 1990 of the American Petroleum Institute. The results of the tests are set forth in Table I below.

TABLE I

Fluid Loss Tests Utilizing Various Additives

| Additive | Fluid Loss at 180° F., cc/30 min. |
| --- | --- |
| Hydroxyethylcellulose | 1200 |
| Carboxymethylhydroxyethylcellulose | 1200 |
| Starch | 1200 |
| Cationic Derivatized Starch | 64 |

From Table I above, it can be seen that the fluid loss additive of this invention provided excellent fluid loss control as compared to the prior art additives tested.

EXAMPLE 2

A cement composition of this invention was prepared comprised of 332.5 grams of calcium aluminate, 332.5 grams of class F fly ash, 35 grams of sodium polyphosphate, 12.6 grams of cationic derivatized starch fluid loss control additive, 6.3 grams of tartaric acid set retarder, 6.3 grams of citric acid set retarder and 368 grams of water. The cement composition was then tested for thickening time and fluid loss at 245° F. in accordance with the above mentioned API specification 10. The results of these tests are as follows:

245° F. Thickening Time: 5 hrs.:48 min.

245° F. Fluid Loss: 40 cc/30 min.

Thus, the cement compositions of this invention have good thickening times and low fluid losses.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A cement composition comprising:
   calcium aluminate;
   fly ash;
   sodium polyphosphate;
   a cationic derivatized starch fluid loss control additive; and
   water.

2. The composition of claim 1 wherein the calcium aluminate is present in the composition in an amount in the range of from about 15% to about 50% by weight of the composition.

3. The composition of claim 1 wherein the fly ash is present in the composition in an amount in the range of from about 15% to about 50% by weight of the composition.

4. The composition of claim 1 wherein the sodium polyphosphate is present in the composition in an amount in the range of from about 2% to about 13% by weight of the composition.

5. The composition of claim 1 wherein the sodium polyphosphate is present in an amount sufficient to combine with the calcium aluminate to form calcium phosphate.

6. The composition of claim 1 wherein the fluid loss control additive is present in the composition in an amount in the range of from about 0.5% to about 2% by weight of the composition.

7. The composition of claim 1 wherein the fluid loss control additive is present in an amount sufficient to prevent fluid loss from the composition.

8. The composition of claim 1 wherein the fluid loss control additive is the reaction product of amylopectin and 3-chloro-2-hydroxytrimethylammonium chloride.

9. The composition of claim 1 wherein the water is selected from the group of fresh water and salt water.

10. The composition of claim 1 wherein the water is present in the composition in an amount in the range of from about 30% to about 60% by weight of the composition.

11. The composition of claim 1 wherein the water is present in an amount sufficient to form a pumpable slurry.

12. The composition of claim 1 further comprising ground rubber particles present in an amount in the range of from about 10% to about 40% by weight of the composition.

13. The composition of claim 1 further comprising ground rubber particles present in an amount sufficient to provide resiliency to the composition when set.

14. The composition of claim 1 further comprising a set retarder selected from the group consisting of tartaric acid and citric acid.

15. The composition of claim 1 further comprising a set retarder present in an amount in the range of from about 0.5% to about 4% by weight of the composition.

16. The composition of claim 1 further comprising a set retarder in an amount sufficient to lengthen the time in which the cement composition starts to thicken and set so that the composition can be pumped into a well bore and into the zone to be cemented before such thickening takes place.

17. A cement composition comprising:
   calcium aluminate present in an amount in the range of from about 15% to about 50% by weight of the composition;
   fly ash present in an amount in the range of from about 15% to about 50% by weight of the composition;
   sodium polyphosphate present in an amount sufficient to combine with the calcium aluminate to form calcium phosphate;
   a cationic derivatized starch fluid loss control additive present in an amount sufficient to prevent fluid loss from the composition; and
   water present in an amount sufficient to form a pumpable slurry.

18. The composition of claim 17 wherein the sodium polyphosphate is present in the composition in an amount in the range of from about 2% to about 13% by weight of the composition.

19. The composition of claim 17 wherein the fluid loss control additive is present in the composition in an amount in the range of from about 0.5% to about 2% by weight of the composition.

20. The composition of claim 17 wherein the fluid loss control additive is the reaction product of amylopectin and 3-chloro-2-hydroxytrimethylammonium chloride.

21. The composition of claim 17 wherein the water is selected from the group of fresh water and salt water.

22. The composition of claim 17 wherein the water is present in the composition in an amount in the range of from about 30% to about 60% by weight of the composition.

23. The composition of claim 17 further comprising ground rubber particles present in an amount in the range of from about 10% to about 40% by weight of the composition.

24. The composition of claim 17 further comprising ground rubber particles present in an amount sufficient to provide resiliency to the composition when set.

25. The composition of claim 17 further comprising a set retarder selected from the group consisting of tartaric acid and citric acid.

26. The composition of claim 17 further comprising a set retarder present in an amount in the range of from about 0.5% to about 4% by weight of the composition.

27. The composition of claim 17 further comprising a set retarder in an amount sufficient to lengthen the time in which the cement composition starts to thicken and set so that the composition can be pumped into a well bore and into the zone to be cemented before such thickening takes place.

28. A cement composition comprising:
   calcium aluminate present in an amount in the range of from about 15% to about 50% by weight of the composition;
   fly ash present in an amount in the range of from about 15% to about 50% by weight of the composition;
   sodium polyphosphate present in an amount in the range of from about 2% to about 13% by weight of the composition;
   a fluid loss control additive comprises a cationic derivatized starch present in an amount in the range of from about 0.5% to about 2% by weight of the composition; and
   sufficient water to form a pumpable slurry.

29. The composition of claim 28 wherein the water is selected from the group of fresh water and salt water.

30. The composition of claim 28 wherein the water is present in the composition in an amount in the range of from about 30% to about 60% by weight of the composition.

31. The composition of claim 28 wherein the cationic derivatized starch is the reaction product of amylopectin and 3-chloro-2-hydroxytrimethylammonium chloride.

32. The composition of claim 28 further comprising ground rubber particles present in an amount in the range of from about 10% to about 40% by weight of the composition.

33. The composition of claim 28 further comprising an effective amount of a set retarder selected from the group consisting of tartaric acid and citric acid present in an amount in the range of from about 0.5% to about 4% by weight of the composition.

34. A cement composition comprising:
   calcium aluminate present in an amount of about 30.4% by weight of the composition;
   fly ash present in an amount of about 30.4% by weight of the composition;
   sodium polyphosphate present in an amount of about 3.2% by weight of the composition;
   a fluid loss control additive comprising a cationic derivatized starch present in an amount of about 1.1% by weight of the composition; and
   water present in an amount of about 33.7% by weight of the composition.

35. The composition of claim 34 further comprising ground rubber particles present in an amount in the range of from about 10% to about 40% by weight of the composition.

36. The composition of claim 34 further comprising a set retarder selected from the group consisting of tartaric acid and citric acid present in an amount in the range of from about 0.5% to about 4% by weight of the composition.

* * * * *